United States Patent [19]

Wiser-Halladay

[11] Patent Number: 4,920,192
[45] Date of Patent: Apr. 24, 1990

[54] POLYURETHANE QUASI PREPOLYMER FOR PROPPANT CONSOLIDATION

[75] Inventor: Robin Wiser-Halladay, McKinney, Tex.

[73] Assignee: Atlantic Richfield Company, Los Angeles, Calif.

[21] Appl. No.: 304,325

[22] Filed: Jan. 31, 1989

[51] Int. Cl.$^5$ .............................................. C08G 18/75
[52] U.S. Cl. ..................................... 528/48; 166/295; 528/52; 528/55; 528/86
[58] Field of Search ...................... 528/48, 52, 55, 86; 166/295

[56] References Cited

U.S. PATENT DOCUMENTS

| | | | |
|---|---|---|---|
| 3,851,479 | 12/1974 | Argabright et al. | 61/36 |
| 4,114,382 | 9/1978 | Kubens et al. | 405/264 |
| 4,709,002 | 11/1987 | Younes | 528/53 |
| 4,731,427 | 3/1988 | Younes | 528/53 |

Primary Examiner—Maurice J. Welsh
Attorney, Agent, or Firm—James C. Fails

[57] ABSTRACT

A method of preparing a consolidating agent in the form of a polyurethane prepolymer for consolidating a proppant in a subterranean formation about a well employing the improvement characterized by a quasi prepolymer formed by reacting a diol with a stoichiometric excess of isomeric methylene diphenylene diisocyanate and a diluent; and allowing the reactants to stand for a period in excess of two hours at 25 degrees C., whereby to form oligmers of polyurethane chains. The method enables consolidating a proppant in fractures by a slow polymerization process, whereby the curing agent can be added at the same time the proppant is placed. Also disclosed are specific examples of diluents and curing agents.

11 Claims, No Drawings

POLYURETHANE QUASI PREPOLYMER FOR PROPPANT CONSOLIDATION

FIELD OF THE INVENTION

This invention relates to coating of proppants. More particularly, this invention relates to coating proppants that are injected into fractures in subterranean formations such that the proppants will consolidate and remain in place to resist crushing, closing of the fracture, or being flowed back into the well bore.

BACKGROUND OF THE INVENTION

To increase production of a desired hydrocarbonaceous fluid from a subterranean formation about a well, it is frequently necessary to increase the permeability. One of the ways that this can be accomplished is by hydraulic fracturing, which is the process of injecting a viscous fluid at sufficiently high rates and pressures that the formation must fracture to accept the fluid. To keep the fracture from fully closing after the fluid injection has ceased, it is necessary to deposit a proppant with the fracture fluid. One of the difficulties of the earlier art is that the proppants have tended to be produced back into the well causing the fracture to close and have their permeability reduced by crushing.

It is desirable to consolidate the proppant particles together and to have a relatively high compressive strength so as to resist crushing of the proppant under the overburden pressure. In this way, the proppant is retained in the formation, and is not produced back into the bore hole. Resin-coated proppants consolidated downhole have been used to offset this problem.

Any resin-coated proppant should be compatible with the fracturing fluids used to carry it downhole and be as economical as possible. Moreover, extra steps should be curtailed when feasible and eliminated where possible, as will be discussed in more detail hereinafter.

The prior art has ranged from U.S. Pat. No. 3,851,479 showing sealed porous earth formations where the void spaces are reduced with the treatment with aqueous solutions containing hydroxl ions, polyisocyanurates, and polyvinyl alcohol, through U.S. Pat. No. 4,114,382 concerned with consolidating geological formations with a polyol and a special 1,2 alkylene oxide, to recent patents; such as U.S. Pat. No. 4,709,002 describing a method for preparing a molded reaction injection rigid non-cellular polyisocyanurate and U.S. Pat. No. 4,731,427 describing a method of preparing a molded reaction injection rigid polyurethane modified isocyanurate polymer composition. While these patents are pertinent chemically in that the reactants initially are quite similar, the result is vastly different from the invention herein. Specifically, it is desirable that the method of coating a proppant have the following features as well as those earlier noted and not heretofore provided:

1. A problem encountered during experimentation has been that the shearing of the resin-coated proppant causes the resin to come off the proppant and results in little or no consolidation. Therefore a more viscous, high molecular weight resin has been employed in this invention, which has a lower energy of activation.

2. Another problem has been that, when simulating shearing action that the coated proppant, or sand, will undergo before or during pumping downhole, the turbulent motion should not cause premature polymerization of the resin. Expressed otherwise, polymerization should not be occurring at this time. It is desirable that a reduced degree of reactivity of any coating be achieved so that it does not come off the sand when admixed with a carrier at this time.

3. The quasi prepolymer allows the use of a slowacting catalyst such as water if desired.

4. The resin should have a higher viscosity and a greater wettability on the proppant, than provided heretofore.

5. As indicate hereinbefore, there should be elimination of the step of providing a silane coupling reagent as is done with other resin-coated proppants.

6. The resin coating the proppant should be easier to use in the field. Expressed otherwise, it should exist as a single solution, or one component polyurethane system, that can be coated onto the proppant readily.

7. Also, the prepolymer should stay coated onto the proppant and not defuse off into the formation. In our invention, it does not, and therefore the pore spaces stay open and are not filled as in the aforementioned patents and inventions.

It is apparent that the prior art has failed to provide the above delineated features.

SUMMARY OF THE INVENTION

Accordingly, it is an object of this invention to provide one or more of the foregoing delineated features not heretofore provided by the prior art.

It is an object of this invention to provide all of the foregoing features not provided in the prior art.

These and other objects will become apparent from the descriptive matter hereinafter.

In accordance with one embodiment of this invention there is provided a method for forming a polyurethane quasi prepolymer by reacting in intimate admixture a diol and in stoichiometric excess isomeric methylene diphenylene diisocyanate (MDI), in a diluent; and allowing the reactants to stand in intimate admixture, preferably for a period of exceeding two hours at at least 25 degrees C., whereby to form oligomers of polyurethane chains. The reaction has been followed with infrared spectroscopy and for the most part appears to be over in the specified time period. The diluent is selected preferably from the class consisting of dimethyl formamide, propylene carbonate, and dimethyl sulfoxide, all of which are miscible with the monomers.

DESCRIPTION OF PREFERRED EMBODIMENTS

In this invention, the sand and consolidating agent have the features and characteristics desired and set out hereinbefore. The resin employed herein is in the form of a urethane quasi prepolymer that has a viscosity of more than 7,000 centipoises (cp) and serves as a means for consolidating the proppant in situ after the proppant is emplaced in the fractures. The consolidating resin is compatible with the chemical components of the frac fluids, as well as with the in situ hydrocarbonaceous fluids tested.

It is also desirable to eliminate the silanation which has been required for other systems heretofore. Moreover, the resins of the prior art have required temperatures in excess of 90 degrees Fahrenheit (°F) to effect curing and subsequent consolidation. It is desirable to have a coated proppant that can be cured at temperatures below 90 degrees for application in low temperature wells. This invention provides both of these features. Also, this resin can be cured by flushing a catalyst downhole at the same time the resin and proppant are sent. This is quite an advantage. Also, some of the lower ratios of MDI/DPG (dipropylene glycol) can be cured by heat alone to yield sufficient compressive strengths.

Also, this invention eliminates the silanation which has been required for other systems hereinbefore, since it does not require a silane linkage.

This invention is closely related to another invention of which the inventor is a co-inventor and entitled "Consolidation Employing a Polyurethane Quasi Prepolymer," docket DF-676, Ser. No. 304,314, filed even date herewith and assigned to the assignee of this invention. The descriptive matter of that invention is incorporated herein by reference for any details that are omitted herefrom. An abbreviated form is incorporated herein to give the reader a sense of the environment without requiring a look at that referenced application.

In accordance with this invention, there is prepared a prepolymer by admixing in intimate contact a diol such as dipropylene glycol (DPG) and source of methylene diphenylene diisocyanate (MDI), such as an isomeric mixture. A diluent is added to keep the viscosity low enough to produce a resin which is flowable and usable.

Low molecular weight polyols (triols or greater) will not work in this invention since they form too much branching, causing the resin to become too viscous to work with. Diols are satisfactory, preferably those containing 2–8 carbon atoms. Examples of the diols are 1,4-butanediol, ethylene glycol, diethylene glycol, dipropylene glycol, and 2,5-hexanediol.

These chemicals are defined in Hackh's Chemical Dictionary, fourth edition, Grant, editor, McGraw-Hill Book Company, 1969; and do not require further detailed description herein. It is also sufficient to note that these chemical reactants are commercially available from suppliers of chemical products.

Isomeric methylene diphenylene diisocyanate is preferred because it is commercially available from respective sources as the following trademarked product Mondur MR from Mobay Corporation; Rubinate M from ICI; PAPI 135 available from Dow Chemical; and MI from BASF.

While these monomers can react in intimate admixture alone, it is preferable to employ diluent to keep the viscosity low enough to be flowable and hence keep the solution of the prepolymer usable. The diluent preferably can be selected from the class consisting of polar aprotic solvents consisting of dimethyl formamide, propylene carbonate, dimethyl sulfoxide. Most preferably it can be propylene carbonate which has been tested with good results.

It is clear from the data that when no quasi prepolymer is formed, no satisfactory consolidation is effected (that is, no set is experienced that will give appreciable strength).

The following explanation is given as to why the prepolymer enables the method of consolidating a proppant in a fracture to work. Experimental data has shown that the curing of the prepolymer enables the consolidation of the proppant to occur and build compressive strength.

During the forming of the prepolymer, anionic polymerization of methylene diphenylene diisocyanate occurs with a diol to form the block copolymer polyurethane. When dipropylene glycol is used as the comonomer a linear polymer can be produced. The following prepolymer product represents one repeat unit, as shown by the reaction of Formula I.

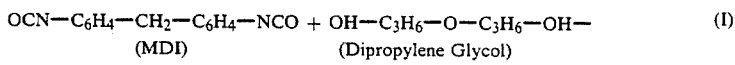

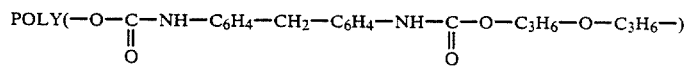

(Polyurethane chain present in the propolymer.)

Another reaction which occurs with a catalyst other than water, such as dimethyl ethanolamine is the production of trimers, forming from the coming together of three molecules of MDI. This greatly increases the degree of branching due to the R groups on the molecule, as shown in Formula II hereinafter, representative diisocyanate molecules which can interact either with more MDI or which have already reacted with diol to form homopolymer trimers or copolymer linear chains respectively which were already part of the prepolymer. In the prepolymer there are monomers of MDI and then there are polyurethane chains which are terminated by MDI molecules which have the reactive isocyanate group ($-N=C=O$).

Sweeney, F. Melvin, in "Introduction to Reaction Injection Molding," 1979, pp. 34–35, reports that with water, both biuret linkages and allophanate linkages are formed, as shown by Formula II, resulting in branching, also.

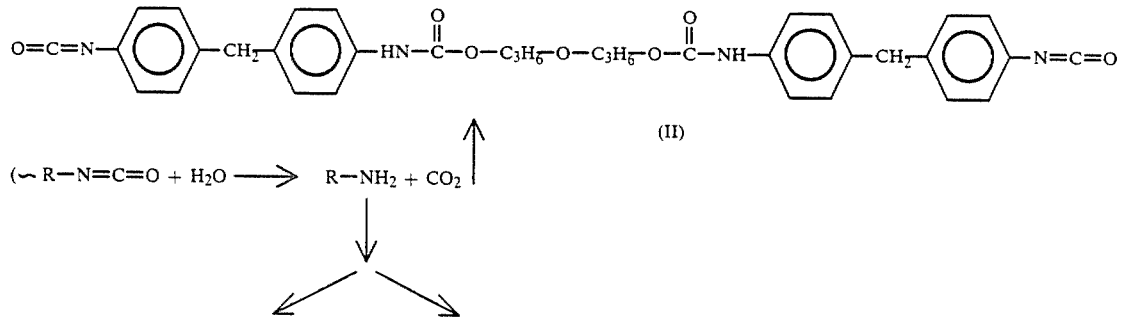

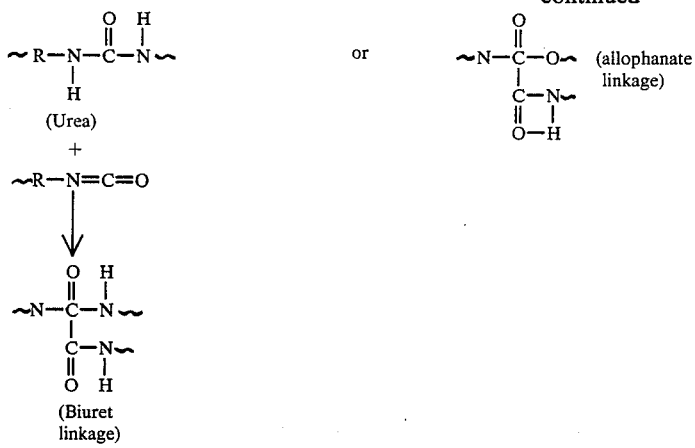

When employed with a tertiary amine catalyst, a type of structure formed by III is theorized to be employed for the catalyzed polymerization and consequent consolidation.

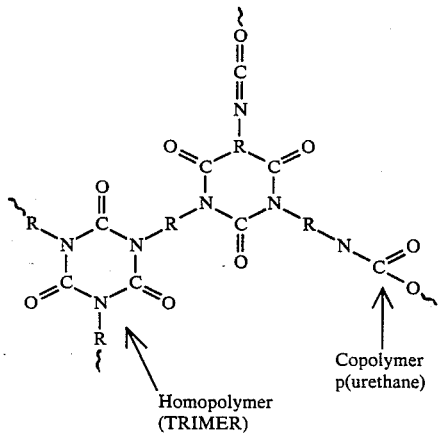

Three (3) isocyanates, or MDI molecules, come together in forming the trimer.

The MDI is less toxic than most other aromatic isocyanates and will serve as the best source for large scale fracturing operations. The dipropylene glycol was chosen based on the fact that it was a diol that produced sufficient compressive strengths. It has been found to give the best strengths when compared to various other polyols and decreases the degree of tackiness that is produced during shearing or the pumping operation, particularly when admixed with proppant.

The prepolymer has been made compatible with frac fluid systems such as alkyl ortho-phosphate gelled diesels and also various crudes. The crudes are viscous enough for proppant transport and are more economical than the commercial gelling systems.

The 2:1 ratio of MDI to DPG makes a very viscous admixture so it is preferred to use at least 3:1 or more of methylene diphenylene diisocyanate to the diol.

It is preferred to add a catalyst from the group consisting of water or strong base like a tertiary amine. Moreover, lease crudes that contain organometallics can catalyze the reaction.

It is also preferred to add sand as the proppant to be consolidated and in a proportion within the range of 95-98 parts by weight per 2-5 parts by weight of prepolymer.

EXAMPLES

These examples show strengths obtained by following procedures simulating an environment similar to what the proppant would experience in a field test, or a real-life fracturing operation. Parts are parts by weight.

EXAMPLE I

Seven parts 4,4- methylene diphenylene diisocyanate (MDI) was reacted with one part of dipropylene glycol (DPG) in intimate admixture in 25% by weight of propylene carbonate. The result was to form a prepolymer with excess MDI containing a diluent of propylene carbonate. In this experiment, the resinous reactants after the prepolymer had formed were admixed in about 5% by weight with a proppant, which in this case was 20/40 mesh sand and, thereafter, alkyl ortho-phosphate diesel was admixed with the sand containing the consolidating agent and the consolidating agent on the sand allowed to set. When tested, the consolidated strength was as much as 382 pounds per square inch (psi).

EXAMPLE II

The same prepolymer prepared from seven parts methylene diphenylene diisocyanate (MDI) reacted with one part DPG in the propylene carbonate diluent was added to gelled diesel which had slightly less water than Example I causing the strength to increase. The strength was lower in Example I, due to prereaction between the water and the gel and the prepolymer. When a specific gelled diesel; namely, YFGO (IV) from Dowell Schlumberger was employed, a formulation set strength of consolidation was found to be as much as 1023 psi.

EXAMPLE III

A prepolymer was formed similarly as described in Example I. The prepolymer was admixed with a catalyst. In this case, the catalyst was comprised of 0.9 grams of water per 90 grams of lease crude. The lease crude also had a minor proportion of less than 1% by weight of organo metallics or tertiary amines that could have also catalyzed the reaction. A moisture cure was effected in any event, so that a set strength of as much as 591 psi was obtained when the proppant, in this case sand, was allowed to be consolidated by the prepolymer.

EXAMPLE IV

When the MDI was employed alone or MDI and DPG together, without time for a prepolymer to form, the results gave substantially no consolidation, even in the alkyl o-phosphate gelled diesel. This is due to lower wettability and also to the reaction between DPG and MDI occurring at the same time the shearing step was performed.

The following examples are given to illustrate different reactants with the methylene diphenylene diisocyanate.

EXAMPLE V

Five parts of MDI were reacted with one part of 1,4-butane diol and employed rapidly without forming prepolymer. No significant strength was obtained with this consolidation and it must be deemed inoperable without the formation of the prepolymer.

EXAMPLE VI

Five parts MDI were reacted with one part of dipropylene glycol and time was allowed to form a prepolymer. This gave a set strength of up to 1411 psi. When the same reactants were reacted rapidly and injected with the sand with no time for forming a prepolymer, essentially no consolidation of significance was formed.

EXAMPLE VII

When seven parts of MDI were reacted with one part of 2,5-hexane diol and time was allowed for prepolymer to form, a compressive strength of about 291 psi was obtained.

In the foregoing Examples IV–VI, the resin was admixed directly with the sand before being added to the frac fluid.

When the resin-coated sand is added to crude oil and is catalyzed by water added additionally in amount sufficient to effect the moisture cure, for example about 0.15 parts water to about 1 part prepolymer by weight, an average cure strength of about 400 psi can be obtained.

EXAMPLE VIII

Three parts of MDI were allowed to react in intimate admixture with one part dipropylene glycol and directly slurried with crude oil. The sand was added thereafter. A consolidation strength of up to 260 psi was obtained.

When the admixture of proppant and prepolymer are emplaced in a low-temperature formation, it is preferable to admix with them a catalyst to enhance the setting at the low temperature. A plurality of ratios of reactants ranging from 3 parts methylene diphenylene diisocyanate per part of diol such as dipropylene glycol (PTS MDI/PT DPG) to 12/1 were successful in giving consolidation when employed in gelled diesel with no shearing to simulate pumping.

Table I shows respective strengths of consolidation in pounds per square inch of the finished consolidated proppant.

TABLE I

| Ratio of Reactants (Pts MDI/Pt DPG) | Strengths of Consolidation (PSI) |
| --- | --- |
| 12/1 | 382 |
| 10/1 | 332 |
| 9/1 | 472 |
| 7/1 | 827 |
| 5/1 | 991 |
| 3/1 (worked but not quantified.) | |
| 2/1 (too viscous to be useful.) | |

All test results given resulted from employing standard American Society for Testing Materials (ASTM) testing procedures.

Having thus described the invention, it will be understood that such description has been given by way of illustration and example and not by way of limitation, reference for the latter purpose being had to the appended claims.

What is claimed is:

1. A method for forming a quasi prepolymer containing polyurethane linkages comprising:
   a. forming said quasi prepolymer by reacting in intimate admixture a diol and in stoichiometric excess methylene diphenylene diisocyanate, all in the presence of a diluent; and
   b. allowing the reactants to stand in intimate admixture for a time sufficient to form oligmers containing polyurethane linkages.

2. The method of claim 1 wherein the weight ratio of the isomeric methylene diphenylene diisocyanate to the diol is within the range of 12:1 to 2:1.

3. The method of claim 1 wherein said diol is dipropylene glycol.

4. The method of claim 1 wherein said diluent is selected from the class consisting of dimethyl formamide, propylene carbonate, and dimethyl sulfoxide.

5. The method of claim 1 further comprising adding a catalyst to the quasi prepolymer resulting from step b.

6. The method of claim 5 wherein the catalyst added to the quasi prepolymer of step b. is selected from the group consisting of water and a strong base.

7. The method of claim 1 wherein a catalyst is employed and said catalyst is an organo metallic contained in a minor amount in a hydrocarbonaceous liquid.

8. The method of claim 1 wherein said catalyst is water in a proportion sufficient to effect a moisture cure after emplacement.

9. The method of claim 5 wherein a proppant is added as an inert filler to the quasi prepolymer and product admixture before injecting into a well.

10. The method of claim 9 wherein said proppant is sand and said sand is present in a proportion in the range of 95–98 percent by weight.

11. The method of claim 1 wherein said method is employed for consolidating a proppant injected in subterranean formations with a a curing agent, for production to the earth's surface via a well a desired hydrocarbonaceous fluid wherein said methylene diphenylene diisocyanate is an isomeric admixture of methylene diphenylene diisocyanate, and wherein said reactants are allowed to stand in intimate admixture for at least 2 hours at at least 25 degrees C.

* * * * *